US008242954B2

(12) United States Patent
Urlichich et al.

(10) Patent No.: US 8,242,954 B2
(45) Date of Patent: Aug. 14, 2012

(54) METHOD AND DEVICE OF SATELLITE NAVIGATION SYSTEM'S INTEGRITY CONTROL

(75) Inventors: Yury Matevich Urlichich, Moscow (RU); Vyacheslav Ivanovich Nemtsev, Moscow (RU); Alexander Victorovich Kruglov, Moscow (RU)

(73) Assignee: Joint Stock Company "Russian Space Systems" (JSC "RSS"), Moscow (RU)

( * ) Notice: Subject to any disclaimer, the term of this patent is extended or adjusted under 35 U.S.C. 154(b) by 0 days.

(21) Appl. No.: 13/124,687

(22) PCT Filed: Nov. 5, 2008

(86) PCT No.: PCT/RU2008/000685
§ 371 (c)(1),
(2), (4) Date: Apr. 18, 2011

(87) PCT Pub. No.: WO2010/053395
PCT Pub. Date: May 14, 2010

(65) Prior Publication Data
US 2011/0205112 A1 Aug. 25, 2011

(51) Int. Cl.
*G01S 19/20* (2010.01)
*G01S 19/02* (2010.01)

(52) U.S. Cl. .................. 342/357.58; 342/357.395

(58) Field of Classification Search ... 342/357.2–357.78
See application file for complete search history.

(56) References Cited

U.S. PATENT DOCUMENTS

| 5,585,800 A | 12/1996 | Chubb | |
|---|---|---|---|
| 6,462,707 B1 * | 10/2002 | Clark | 342/357.395 |
| 7,095,369 B1 * | 8/2006 | Clark | 342/357.58 |

FOREIGN PATENT DOCUMENTS

| RU | 2012012 C1 | 4/1994 |
|---|---|---|
| RU | 2175771 C1 | 11/2001 |
| RU | 2253127 C2 | 5/2005 |

\* cited by examiner

*Primary Examiner* — Gregory C Issing
*Assistant Examiner* — Nga X Nguyen
(74) *Attorney, Agent, or Firm* — Volpe and Koenig, P.C.

(57) ABSTRACT

This disclosure relates to the field of space and can be used for radio navigation determinations using man-made satellites of the Earth, in particular, for monitoring the integrity of a system without participation of ground control segment facilities and monitoring stations allocated globally. The apparatus includes: enhancement of responsiveness of a user's notification about navigation signal uncertainty; reduction of costs for solving the problem of the system integrity monitoring due to absence of ground control and monitoring complexes allocated globally; exclusion of complementary radio links; improvement of system integrity monitoring certainty; growth of reliability.

10 Claims, 3 Drawing Sheets

METHOD AND DEVICE OF SATELLITE NAVIGATION SYSTEM'S INTEGRITY CONTROL

FIELD OF INVENTION

The present invention relates to the area of space exploration and can be used for satellite aided radio navigation, in particular, for the system integrity control operating without attendance of ground control segment's facilities and globally allocated control stations.

STATE OF THE ART

A time allowance has been established for the GLONASS system between the moment of appearing an inconsistency of the satellite's digital information with the true state of satellite and the moment of notifying the navigation signal's user about this signal inconsistency.

This time allowance amounts to units of seconds independently on the satellite's location.

The procedure of uncertainty determination in itself is adopted to be called as the system integrity control. The ground-based control segments incorporate the control means intended to determine the navigation signal integrity and to record the uncertainty flag to the satellite. However, these control means are placed at the RF territory only and they are not accessible for the satellites being not visible from the Russian territory, therefore, they are unable to meet the requirement concerning the rapidity of introducing the uncertainty flag into a navigation frame.

From the prior art the technologies of navigation system's integrity control are known, which are disclosed in [1], [2], [3], [4], [5], [6], [7] and [8]. The prior knowledge closely approximating the claimed technical solution is the satellite navigation system, which is disclosed in [4] and the essence of which lies in the following.

In the known satellite navigation system the navigation signals from the satellites arrive at ground-based measuring stations, one of which is the reference one; these stations serve for measuring the pseudo-ranges and the measurement results from each measuring station shall be delivered to the processing center for performing the subsequent operations.

The said existing satellite navigation systems foresee a global allocation of control stations, which upon revealing an uncertainty, load the navigation signal's uncertainty flag into the satellite or transmit an event notification to the system control center (SCC), which sends the uncertainty flag to the satellite.

The known technical solutions have a number of shortages, among them:

a very high cost of global allocation and maintenance of control stations;

a necessity to establish an additional radio link <<control station - satellite>>0 for each satellite of the system in case when the uncertainty flag shall be directly laid from a control station;

a possibility of intervention of a third persons in this radio link and distortion of results of the system integrity control;

a necessity to establish an operational communication system with using the repeater-satellites for linking the control stations with the system control center (SCC) and for linking the SCC with the satellite.

DISCLOSURE OF THE INVENTION

The objective of this invention is to provide the integrity control of a satellite navigation system without attendance of ground control segment's facilities and globally allocated control stations.

The technical result of the claimed technical solution is:
enhancement of responsiveness of a user's notification about navigation signal uncertainty;
reduction of costs for solving the task of the system's integrity control due to the fact of lacking the globally allocated ground control and monitoring complexes;
exclusion of complementary radio links;
improvement of system's integrity control validity;
growth of reliability.

The technical result is achieved due to the fact that the method of GNSS navigation field integrity control assumes the check of navigation signal's digital data, insertion of uncertainty flag into the navigation signal, determination of estimated pseudo-range up to the other GNSS reference satellites, by each GNSS satellite, determination of discrepancies of pseudo-range measurements, determination of compliance of measurement discrepancies with targeted tolerance and logging by each satellite the navigation signal's uncertainty flag into digital data of the own navigation signal.

Besides, the satellites to be used as the reference ones are located within the visibility zone of the ground control segment. As the reference satellites the opposed satellites are used. The discrepancies in measurements of pseudo-ranges up to the other GNSS reference satellites shall be determined by each satellite of the GNSS at every current second. Measurement of the pseudo-range to selected reference satellites shall be accomplished sequentially or concurrently on the basis of system's almanac (SA) or in accordance with the program laid by the ground control segment.

For the purpose of realizing the method of the GNSS system's integrity control each satellite contains a transmitter-receiver unit, a computer, a navigation signal generator, a source of navigation signal, a pseudo-range measuring instrument, an unit for calculation of pseudo-range to the other reference GNSS satellites, an unit for comparison of estimated pseudo-range with the measured one, a control unit, a decision making unit, whereas the first output of the transmitter-receiver facility is connected with the input of the control unit, the second output of the transmitter-receiver facility is connected with the input of computer, the I/O of which is connected with the unit for calculation of pseudo-range to the other reference satellites, the computer's output is connected with the first input of the navigation signal generator, the second input of the navigation signal generator is connected with the output of decision making unit, the first input of the decision making unit is connected with output of the unit for comparison of estimated pseudo-range with the measured one, the second input of the decision making unit is connected with the third output of the control unit, the first input of the unit for comparison of estimated pseudo-range with measured one is connected with output of the unit for computing the pseudo-range to the other reference satellites, the second input of the unit for comparison of estimated pseudo-range with the measured one, the second input of the unit for comparison of estimated pseudo-range with the measured one is connected with the first output of pseudo-range measuring instrument, the third input of the unit for comparison of estimated pseudo-range with the measured one is connected with the output of control unit, the second output of pseudo-range measuring instrument is connected with the first input of the unit for calculating the pseudo-range to the other reference satellites, the first output of the control unit is connected with the second input of the unit for calculating the pseudo-range to the other reference satellites, the second output of the control unit is connected with the input of pseudo-range measuring instrument, the output of navigation signal generator is connected with the input of navigation signal source.

Whereas the satellites which are located within the visibility zone of the ground control segment shall be used as the reference ones. As reference satellites the opposed satellites shall be used. The unit for calculating the pseudo-range to the other GNSS reference satellites performs the calculation at every current second. The control unit sets for pseudo-range measuring instrument a sequential or a concurrent regime of measuring the pseudo-range to a selected reference satellite.

BRIEF DESCRIPTION OF THE DRAWINGS

The features and essence of this invention will be readily apparent from the following detailed description, taken in conjunction with accompanying drawings in which the following elements are designated with similar references.

Figure 1:
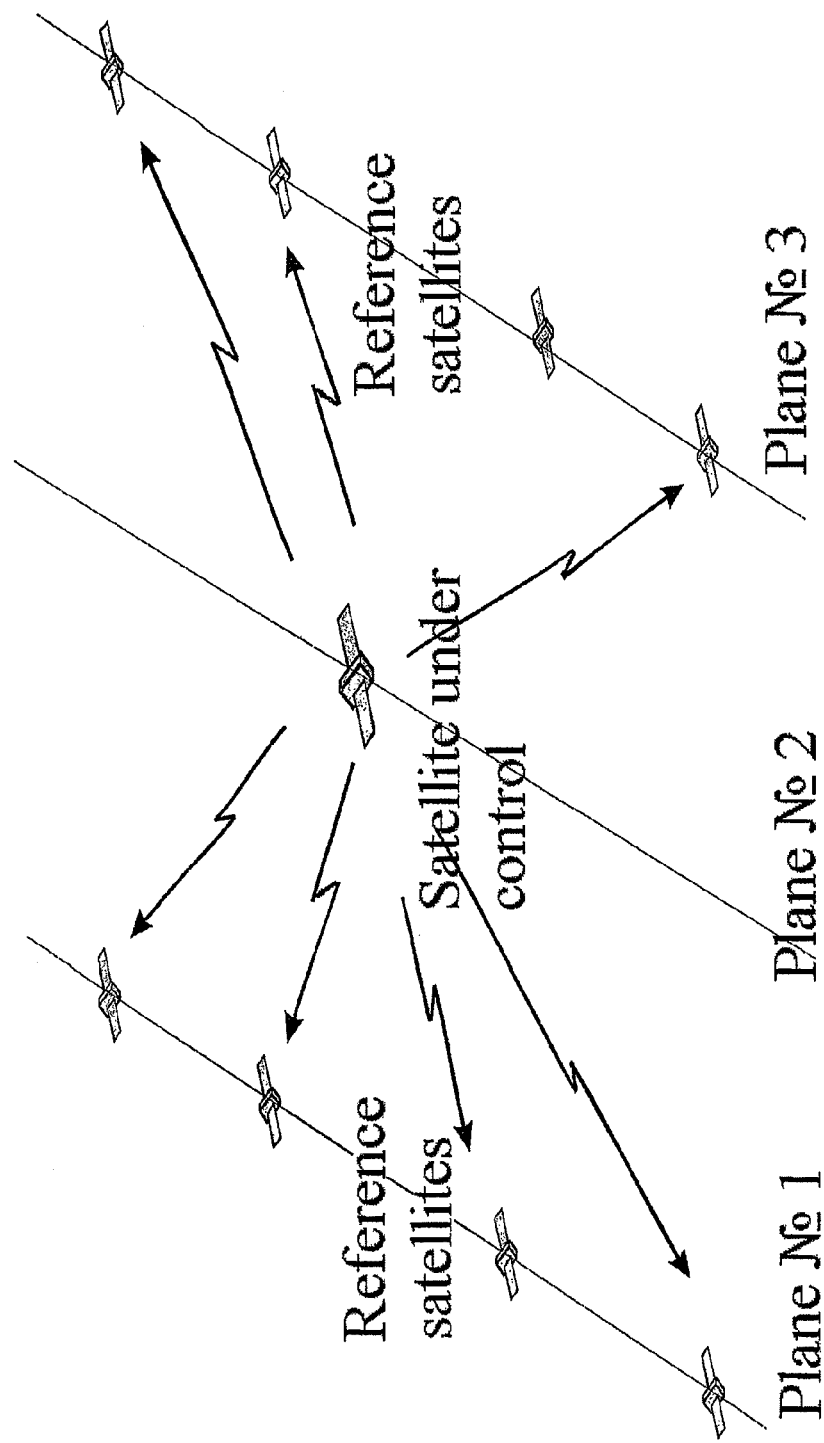
FIG. 1 shows a generalized circuit layout of the navigation satellite system GLONASS in three planes.

Referring initially to FIG. 1 there is shown an allocation of the reference satellites and the controlled satellite of the GLONASS system in three planes.

Figure 2:
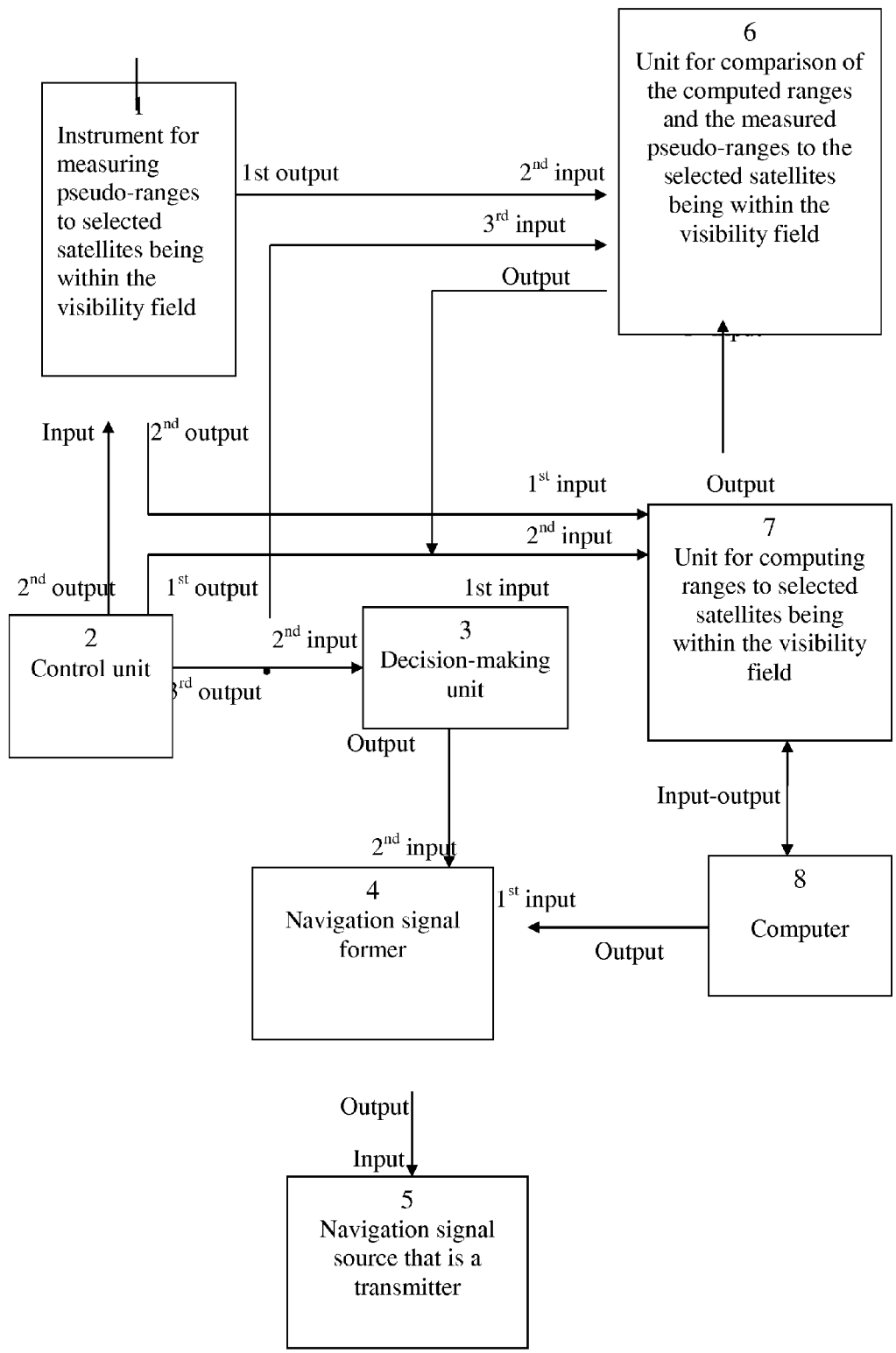
FIG. 2 provides a block-diagram of a claimed device designed for realizing the method of integrity control of the navigation satellite system GLONASS.

In FIG. 2 it is shown a block-diagram of a claimed device designed for realizing the method of integrity control of the navigation satellite system GLONASS, comprising the following units and designations:

1—pseudo-range measuring instrument;
2—control unit;
3—decision-making unit;
4—navigation signal generator;
5—source of navigation signal;
6—unit for comparison of estimated pseudo-range with the measured one;
7—unit for calculating the pseudo-range to other reference satellites of the system;
8—computer;
9—transmitter-receiver unit.

Figure 3:
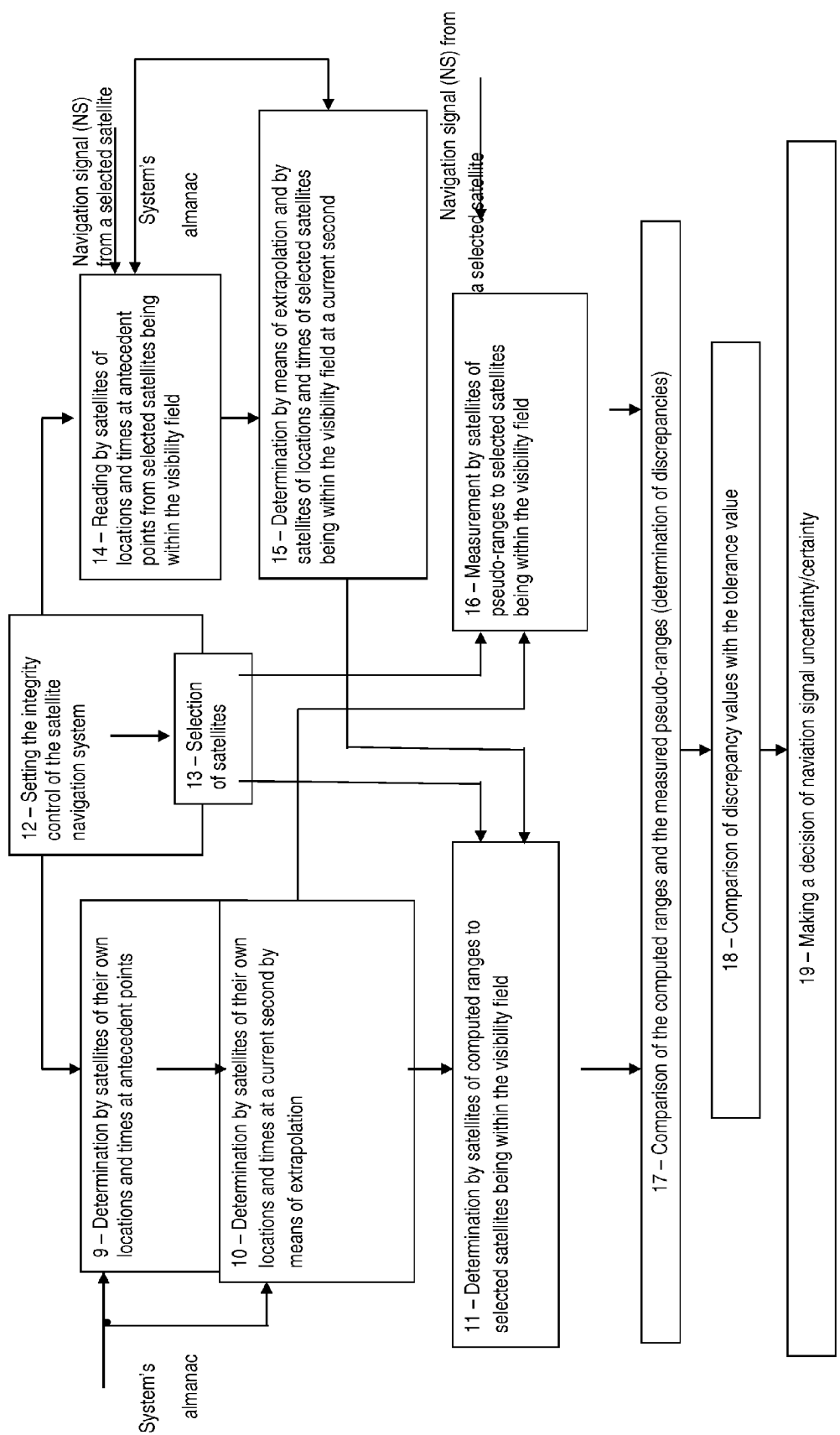
FIG. 3 shows an algorithm of realizing the clamed method of the device operation.

FIG. 3 shows an algorithm for realizing the claimed method of device operation.

Embodiment of the Invention.

The essence of the technical solution lies in that each navigation satellite determines independently the integrity of its own radiated navigation signal.

An uncertainty can be caused by inadequate digital information in the navigation signal, its discordancee with the real state of the satellite or unauthorized breach of on-board frequency standard's stability.

The integrity shall be determined by estimating the value of navigation signal's discrepancies (comparison of pseudo-range estimated value with the measured one) for each satellite of the system relative to the other satellites.

When the value of discrepancy of pseudo-range measurement made by one satellite and measurements made by several other satellites of the system exceeds the target tolerance, it witnesses, that this satellite radiates an invalid (uncertain) navigation signal and lay down the uncertainty flag in its navigation frame.

As long as each satellite of the system performs the said operations uninterruptedly or synchronously with the data updating in the navigation frame, the whole navigation system remains under constant integrity control. Therewith, the integrity of the navigation field is provided with a delay, that is less, than a specified norm and doesn't exceed the length of the satellite's computational process.

The operation of the device with the aim to realize the method of the GLONACC system's integrity control is accomplished as follows.

Through a transmitter-receiver unit the ground control segment lays into each satellite the system's almanac, comprising the reference data on all satellites of the system, namely, initial conditions of movement (information concerning the longitude and the time when the sub-satellite point intersects the equator, eccentricity of the orbit), as well as the data concerning the time scale of the on-board frequency standard. Relying on this information the unit for calculating the pseudo-range to the other reference satellites of the system estimates the pseudo-range to other satellites at every current second. The control unit impels the pseudo-range measuring device to measure the pseudo-range up to the selected reference satellites of the system in sequential or concurrent mode. The pseudo-range shall be measured by comparing the navigation signal phase of the reference satellites with the own time scale. The measured pseudo-range value is compared with the estimated one. For providing the control reliability the operations of pseudo-range measurement and comparison with the estimated value are implemented with several reference satellites.

If the result of pseudo-range comparison is positive, then it is considered, that the satellite, performing the control operation, radiates a valid signal. If the comparison of pseudo-range with all the reference satellites has a negative result, it is an evidence of uncertainty of navigation signal from the satellite which performs the control operation, and in this case the decision making unit inserts an uncertainty flag into the navigation frame, containing on-line data needed by the user for solution of tasks of positioning, definition of motion vector and binding to the system's time, the State Standard, and to the UTC.

A cause of a navigation signal uncertainty (a signal at carrier frequencies of 1600 MHz, 1200 MHz, which comprises a pseudo-random code sequence, a digitized second and values of ephemeris and corrections to the system's time) can be:

distortion of digital data in the navigation frame, compiled by the computer;

mismatch of satellite motion parameters with predictive values due to satellite behavior (orientation inaccuracy, passing the Earth and the Moon shadows etc.), breach of stability of the on-board frequency and time standard.

In order to make decision in regard to the uncertainty it doesn't matter what is the cause of trouble. It is necessary to prevent the user from making an uncertain solution of positioning task relative to the movement vector.

The choice of reference satellites for implementing the control shall be made according to the algorithm being realized in the satellite's computer. For enhancement of functional possibilities of the control the opposed satellites of the system can be assigned as the reference ones.

Functions of Units (FIG. 2).

1. The Computer (8).

In the state-of-the-art navigation satellites the generation of the navigation signal's digital component takes place directly in the satellite. For that to realize the initial conditions of motion and polynomial of "replication" (definition of predictive values of satellite location and on-board time scale phase) shall be updated using the means of the ground control complex with some periodicity, determined by a tolerable degradation of motion parameters and on-board time scale. On the basis of this information the computer (8) determines the given parameters at 15-th and 45-th minutes of each hour and yields these parameters in the digital form to the navigation signal generator (4).

At the moment of implementing the system's integrity control the computer (8) extrapolates the value of navigation parameters of the 15-th or 45-th minute when determining their value at the same second when control is implemented.

2. The Unit For Estimating the Pseudo-Range to the Other Satellites of the System (7).

The system's almanac (the digital data of a navigation signal), which includes the reference data concerning the motion parameters and time scale of all system's satellites, is kept within the navigation frame. Using this data and the digital part of a navigation signal from the reference satellites, the unit (7) determines the motion parameters and the phase of reference satellites' time scale. In availability of location values, time scale phase of two satellites (the own and the reference one) the unit (7) calculates the estimated pseudo-range value between the two satellites, which shall be used further for determination of discrepancies during pseudo-range measurements.

3. Pseudo-Range Measuring Instrument (1).

This unit is designed to measure the pseudo-range to a reference satellite. The measurement is performed by receiving a navigation signal from a reference satellite relative to the own time scale of controlled satellites. The value of the measured pseudo-range arrives to the unit for comparison of the estimated and the measured pseudo-ranges (6) for determining the pseudo-range discrepancies.

4. Decision-Making Unit (3).

In different situations the navigation system's owner enables to change the accuracy of navigation determinations acceptable for the user. This is possible to be achieved by means of coarsening the navigation signal (in less significant bits of digital information). Of course, in case of changing the navigation signal accuracy it will also change the acceptable value of measurement discrepancies. The unit (3) compares the obtained solutions of discrepancies for given satellites with specified threshold value and yields a signal into the navigation signal generator (4) for logging the uncertainty flag into digital data.

5. Unit for Comparison of the Estimated and the Measured Pseudo-Ranges (6).

From the output of the pseudo-range measuring unit (1) and the unit for the pseudo-range estimation (7) the pseudo-range values enter the comparison unit (6). Inasmuch as the pseudo-range is measured in the non-inquiry mode the comparison can be made as in units of pseudo-range measurement (kilometers), as in units of time (nanoseconds). A certain discrepancy of pseudo-range values for each satellite is delivered to the decision-making unit (3).

6. Navigation Signal Former (4)

The unit (4) generates the digital data of navigation frame when using the computer (8) data. In the navigation frame's structure a binary code position is foreseen, where the uncertainty flag is introduced on a signal from the decision making unit (3).

7. Navigation Signal Source (5).

The unit (5) is a transmitter, which radiates a navigation signal at the frequency adopted in the system.

8. Control Unit (2).

The control unit (2) coordinates the operations of all the device parts while solving the task of integrity control.

The algorithm of satellite navigation system's integrity control (FIG. 3) shall be realized as follows.

Each satellite of the navigation system transmits a navigation signal comprising a calculated value of its location at the 15-th and 45-th minutes of each hour to unlimited circle of users. By using the initial conditions of motion a system's user or any control means can fix the satellite position at any current second, including the foregoing one. The satellite under control performs this operation relying on digital data, which it transmits in its navigation signal. Involving the system's almanac it is possible to determine the estimated current position of every reference satellite of the system for a chosen second of implementing the operation. The choice of a reference satellite, for which the location shall be determined, shall be made by the controlled satellite according to the assigned algorithm and almanac of the system, but this choice can be for control operation second is accomplished by 1 with the help of assigned algorithm and almanac of the system, but this choice can be principally assigned by the ground control complex. If the location of the controlled and the reference satellites is known then an opportunity appears the estimated range between the satellites to determine. Owing to the fact that each satellite of the system radiates a navigation signal the satellite under control can measure this range by way of receiving a navigation signal from a reference satellite.

A comparison of the estimated and the measured ranges yields either of two results:

the estimated and the measured ranges coincide within a tolerance value which is to say that the navigation signal of the controlled satellite is valid, the discrepancy tolerance for values of the estimated and the measured ranges is assigned by the navigation system's owner depending on what a limiting error is supposed to be presented to an user;

the estimated and the measured ranges don't coincide which witnesses that the navigation signal of one of the satellites (the controlled or the reference ones) is invalid.

So that to remove an ambiguity the satellite under control makes the procedure of range comparison with several reference satellites. If a mismatch in the estimated and the measured ranges with all reference satellites occurs, it is the evidence of uncertainty of the controlled satellite's navigation signal.

The proposed technical solution eliminates the need to allocate the reference stations world-wide, to establish the communications between the controlled stations and the mission control center, to involve a repeater-satellite and excudes the third party intervention during monitoring the system's integrity. A given technical solution provides an utmost efficiency for a system integrity control.

The present invention is effective especially as it is able to be practically applied to progress and to upgrade the satellite system.

Industrial Applicability

This invention refers to the space sphere and is liable to be used for satellite-aided radio navigation determinations, in particular, for a system integrity control without attendance of means of the ground control segment and control stations to be globally deployed. The invention offers to promptly notify a user of the navigation signal uncertainty; to reduce the cost for realization of the system integrity control considering the fact of lacking the ground control and monitoring stations; to exclude the additional radio links; to improve the validity of system's integrity control.

The analysis accomplished has enabled to make a conclusion: the prototypes with a set of features identical with all the features of the claimed technical solution are lacking, witnessing that the claimed technical solution can be considered as feature of <<novelty>>.

The results of searching the prior art solutions with the aim to reveal the features, which coincide with characteristic features of prototype of the claimed system have shown that they are not explicitly originated from the state of the art as well as it was not stated the known influence of the characteristic features on the technical result declared by the authors. Therefore, the claimed invention meets the patentability condition as an <<inventive height>>.

The presentation of functional units in singular form in the present description of the invention and in the claims doesn't exclude an availability of some similar functional units. Additionally, the words <<comprising>> and <<including>> do not exclude an availability of different functional units or stages besides the listed ones.

Despite the fact that the present invention has been shown and described with the reference to its definite preferred versions of embodiments, it will be obvious for the experts for this art that various changes as in form and content of the invention are possible to be realized without deviation from the spirit and bounds of the invention that are defined by the attached claims.

Sources of Information Taken Into Consideration

1. Satellite navigation system based on the RF Patent No 2253128, publ. May, 27, 2005, IPC$^7$ G01S 5/00.
2. Satellite navigation system based on the RF Patent No 2115137, publ. Jul. 10, 1998, IPC$^7$ G01S 5/00.
3. Satellite navigation system based on the RF Patent No 2152050, publ. Jun. 27, 2000, IPC$^7$ G01S 5/14.
4. Satellite navigation system based on the RF Patent No 2175771, publ. Nov. 10, 2001, IPC$^7$ G01S 5/14 (prototype).
5. Satellite navigation system based on the U.S. Pat. No. 5,621,646, publ. Apr. 15, 1997, IPC G01S 1/00.
6. Satellite navigation system based on the U.S. Pat. No. 5,644,318, publ. Jul 1, 1997, IPC G01S 5/14.
7. Satellite navigation system based on the U.S. Pat. No. 5,752,218, publ. May 12, 1998, IPC G01S 5/00.
8. Satellite navigation system based on the U.S. Pat. No. 5,585,800, publ. Dec. 17, 2000, IPC G01S 5/14.

What is claimed is:

1. A method for monitoring an integrity of a satellite navigation system, comprising:
   determining, by system satellites, satellite locations and times at antecedent time points, on a basis of a system almanac;
   determining, by the system satellites and by means of extrapolation, the satellite locations and times at points at a current second on the basis of the system almanac;
   selecting, by the system satellites, system satellites within a visibility zone according to a target algorithm and the system almanac;
   receiving, by the system satellites, navigation signals from the system satellites being within the visibility zone;
   reading, by the system satellites, locations and times at antecedent points from the selected system satellites within the visibility zone, on the basis of the navigation signals from the selected system satellites;
   determining, by the system satellites and by means of extrapolation, locations and times of points of the selected system satellites being within the visibility zone at the current second on the basis of the system almanac;
   determining, by the system satellites, computed ranges to the selected system satellites being within the visibility zone;
   measuring, by the system satellites, pseudo-ranges to the selected system satellites being within the visibility zone by comparing phases of the navigation signals of the selected system satellites being within the visibility zone with own time scale;
   comparing, by the system satellites, the computed ranges with the measured pseudo-ranges to the selected system satellites being within the visibility zone;
   comparing, by the system satellites, discrepancy values with a target tolerance;
   radiating, by the system satellites, an uncertain navigation signal and recording an uncertainty flag to a navigation frame, if the measurement discrepancies are larger than the target tolerance;
   radiating, by the system satellites, a certain signal, if the measurement discrepancies are not larger than the target tolerance.

2. The method according to claim 1, wherein the comparison of the computed ranges with the measured pseudo-ranges to the selected system satellites being within the visibility zone is carried out at any current second.

3. The method according to claim 2, wherein the ranges to the selected system satellites being within the visibility zone are computed at any current second.

4. The method according to claim 3, wherein the ranges to the selected system satellites being within the visibility zone are computed in series or in parallel.

5. The method according to claim 3, wherein the pseudo-ranges to the selected system satellites being within the visibility zone are measured in series or in parallel.

6. A device for monitoring an integrity of a satellite navigation system, including satellites, each system satellite including:
   a computer;
   a navigation signal former;
   a navigation signal source which is a transmitter;
   an instrument for measuring pseudo-ranges to selected system satellites being in a visibility zone;
   a unit for computing ranges to the selected system satellites being within the visibility zone;
   a unit for comparing computed ranges to the selected system satellites being within the visibility zone with the measured pseudo-ranges to the selected system satellites being within the visibility zone;
   a control unit; and
   a decision-making unit, wherein an input-output of the computer is connected with the unit for computing the ranges to the selected system satellites being within the visibility zone, an output of the computer is connected with a first input of the navigation signal former, a second input of the navigation signal former is connected with an output of the decision-making unit, a first input of the decision-making unit is connected with an output of the unit for comparing the computed ranges to the selected system satellites being within the visibility zone with the measured pseudo-ranges to the selected system satellites being within the visibility zone, a second input of the decision-making unit is connected with a third output of the control unit, a first input of the unit for comparing the computed ranges to the selected system satellites being within the visibility zone with the measured pseudo-ranges to the selected system satellites being within the visibility zone is connected with an output of the unit for computing the ranges to the selected system satellites being within the visibility zone, a second input of the unit for comparing the computed ranges to the selected system satellites being within the visibility zone with the measured pseudo-ranges to the selected system satellites being within the visibility zone is connected with a first output of the instrument for measuring the pseudo-ranges to the selected system satellites being within the visibility zone, a third input of the unit for comparing the computed ranges to the selected system satellites being within the visibility zone with the measured pseudo-ranges to the selected system satellites being within the visibility zone is connected with the third output of the control unit, a second output of the instrument for measuring the pseudo-ranges to the selected system satellites being within the visibility zone is connected with a first input of the unit for computing the ranges to the selected system satellites being within the visibility zone, a first output of the control unit is connected with a second input of the unit for computing the ranges to the selected system satellites being within the visibility zone, a second output of the control unit is connected with an input of the instrument for measuring the pseudo-ranges to the selected system satellites being within the visibility zone, an output of the navigation signal former is connected with an input of the navigation signal source being the transmitter.

7. The device according to claim 6, wherein the unit for comparing the computed ranges with the measured pseudo-ranges to the selected system satellites being within the visibility zone determines discrepancies at any current second.

8. The device according to claim 6, wherein the unit for computing the ranges to the selected system satellites being within the visibility zone computes the ranges at any current second.

9. The device according to claim 6, wherein the unit for computing the ranges to the selected system satellites being within the visibility zone computes the ranges in series or in parallel.

10. The device according to claim 6, wherein the instrument for measuring the pseudo-ranges to the selected system satellites being in a visibility zone measures the pseudo-ranges in series or in parallel.

* * * * *